US008820289B2

(12) United States Patent
Green (10) Patent No.: US 8,820,289 B2
(45) Date of Patent: Sep. 2, 2014

(54) MODULE CONTAINMENT OF FUEL CONTROL SYSTEM FOR A VEHICLE

(76) Inventor: Jason Green, Davie, FL (US)

( * ) Notice: Subject to any disclaimer, the term of this patent is extended or adjusted under 35 U.S.C. 154(b) by 339 days.

(21) Appl. No.: 13/246,434

(22) Filed: Sep. 27, 2011

(65) Prior Publication Data
US 2013/0074816 A1    Mar. 28, 2013

(51) Int. Cl.
*F02B 77/00* (2006.01)
*F02M 21/02* (2006.01)
*F02D 19/06* (2006.01)
*F02M 21/06* (2006.01)

(52) U.S. Cl.
CPC ....... *F02D 19/0647* (2013.01); *F02M 21/0245* (2013.01); *Y02T 10/32* (2013.01); *F02M 21/0224* (2013.01); *F02M 21/06* (2013.01)
USPC .................... 123/195 C; 280/834; 123/195 R (58) Field of Classification Search
CPC .... B60K 15/03; B60K 15/063; B60K 15/067; B60K 15/07; B62D 21/16
USPC .................. 123/195 R, 195 A, 195 C, 198 E; 280/830, 831, 834; 180/68.4, 68.3, 180/69.4–69.6; 220/4.14, 4.15, 4.27
See application file for complete search history.

(56) References Cited

U.S. PATENT DOCUMENTS

| | | |
|---|---|---|
| 3,866,781 A | 2/1975 | Stedman et al. |
| 4,006,852 A | 2/1977 | Pilsner et al. |
| 4,078,629 A | 3/1978 | Kutay et al. |
| 4,288,086 A | 9/1981 | Oban et al. |
| 4,335,697 A | 6/1982 | McLean |
| 4,415,051 A | 11/1983 | Taylor |
| 4,442,665 A | 4/1984 | Fick et al. |
| 4,489,699 A | 12/1984 | Poehlman |
| 4,522,159 A | 6/1985 | Engel et al. |
| 4,527,516 A | 7/1985 | Foster |

(Continued)

FOREIGN PATENT DOCUMENTS

| | | |
|---|---|---|
| WO | WO 02101214 | 12/2002 |
| WO | WO2008037175 | 4/2008 |

(Continued)

OTHER PUBLICATIONS

Formal Press Conference Scheduled: "First LNG Mining Truck in U.S. GFS Corp. Converts CAT 777C to 60% Liquefied Natural Gas." (p. 1-96) Pike County Courthouse, Pikeville, KY, Oct. 27, 2010.

(Continued)

*Primary Examiner* — Hung Q Nguyen
(74) *Attorney, Agent, or Firm* — Malloy & Malloy, P.L.

(57) ABSTRACT

A unitary assembly for retaining the various components of a fuel control system on a vehicle, wherein the assembly includes a unitary module at least partially structured in the form of a mounting assembly operative to contain and support at least a portion of the fuel control system specifically including a containment structure or at least one fuel tank for storing and operatively disposing a fuel supply associated with the fuel control system. An electronic control unit of the fuel control system is structured to facilitate metering and distribution of an operative fuel mixture which may include an alternate fuel as well as a conventional distillate fuel. The module and the mounting assembly are cooperatively structured to collectively retain the electronic control unit, the containment structure and at least a portion of a remainder of the fuel control system as a self-contained unit on the vehicle.

22 Claims, 5 Drawing Sheets

(56) References Cited

U.S. PATENT DOCUMENTS

| | | | |
|---|---|---|---|
| 4,535,728 A | 8/1985 | Batchelor | |
| 4,603,674 A | 8/1986 | Tanaka | |
| 4,606,322 A | 8/1986 | Reid et al. | |
| 4,617,904 A | 10/1986 | Pagdin | |
| 4,641,625 A | 2/1987 | Smith | |
| 4,708,094 A | 11/1987 | Helmich et al. | |
| 4,770,428 A | 9/1988 | Sugiyama | |
| 4,799,565 A | 1/1989 | Handa et al. | |
| 4,817,568 A | 4/1989 | Bedford | |
| 4,861,096 A | 8/1989 | Hastings | |
| 4,955,326 A | 9/1990 | Helmich | |
| 5,033,567 A | 7/1991 | Washbburn et al. | |
| 5,050,550 A | 9/1991 | Gao | |
| 5,092,305 A | 3/1992 | King | |
| 5,156,230 A | 10/1992 | Washburn | |
| 5,215,157 A * | 6/1993 | Teich | 180/69.24 |
| 5,224,457 A | 7/1993 | Arsenault et al. | |
| 5,355,854 A | 10/1994 | Aubee | |
| 5,370,097 A | 12/1994 | Davis | |
| 5,379,740 A | 1/1995 | Moore et al. | |
| 5,518,272 A * | 5/1996 | Fukagawa et al. | 280/834 |
| 5,526,786 A | 6/1996 | Beck et al. | |
| 5,546,908 A | 8/1996 | Stokes | |
| 5,566,653 A | 10/1996 | Feuling | |
| 5,593,167 A | 1/1997 | Barnhardt et al. | |
| 5,701,928 A * | 12/1997 | Aoki | 137/312 |
| 5,735,253 A | 4/1998 | Perotto et al. | |
| 5,794,979 A * | 8/1998 | Kasuga et al. | 280/834 |
| 5,810,309 A | 9/1998 | Augustine et al. | |
| 5,845,940 A | 12/1998 | Colburn | |
| 5,937,800 A | 8/1999 | Brown et al. | |
| 6,003,478 A | 12/1999 | Huber | |
| 6,041,762 A | 3/2000 | Sirosh et al. | |
| 6,101,986 A | 8/2000 | Brown et al. | |
| 6,168,229 B1 | 1/2001 | Kooi et al. | |
| 6,250,260 B1 | 6/2001 | Green | |
| 6,289,881 B1 | 9/2001 | Klopp | |
| 6,543,395 B2 | 4/2003 | Green | |
| 6,550,811 B1 | 4/2003 | Bennett et al. | |
| 6,676,163 B2 | 1/2004 | Joitescu et al. | |
| 6,718,952 B2 | 4/2004 | Finch | |
| 6,751,835 B2 | 6/2004 | Fenton | |
| 6,875,258 B2 | 4/2005 | Kuperus | |
| 6,938,928 B2 | 9/2005 | Pfohl et al. | |
| 7,019,626 B1 | 3/2006 | Funk | |
| 7,270,209 B2 * | 9/2007 | Suess | 180/69.5 |
| 7,334,818 B2 | 2/2008 | Mascarenhs et al. | |
| 7,775,311 B1 * | 8/2010 | Hardy et al. | 180/68.5 |
| 7,976,067 B2 | 7/2011 | Naganuma et al. | |
| 8,005,603 B2 | 8/2011 | Fisher et al. | |
| 8,282,132 B2 | 10/2012 | Griesbaum | |
| 8,498,799 B2 | 7/2013 | Matthews, Jr. et al. | |
| 8,534,403 B2 | 9/2013 | Pursifull | |
| 8,556,107 B2 | 10/2013 | McRobbie et al. | |
| 2001/0037549 A1 | 11/2001 | Fenton | |
| 2002/0017088 A1 | 2/2002 | Dillon | |
| 2002/0029770 A1 | 3/2002 | Heffel et al. | |
| 2002/0030397 A1 | 3/2002 | Tamura et al. | |
| 2002/0078918 A1 | 6/2002 | Ancimer et al. | |
| 2003/0178422 A1 | 9/2003 | Kosuge et al. | |
| 2004/0140412 A1 | 7/2004 | Hendzel et al. | |
| 2004/0148086 A1 | 7/2004 | Tafazoli et al. | |
| 2005/0121005 A1 | 6/2005 | Edwards | |
| 2006/0033322 A1 * | 2/2006 | Suess | 280/830 |
| 2008/0023957 A1 | 1/2008 | Diehl | |
| 2009/0320786 A1 | 12/2009 | Fisher | |
| 2010/0045017 A1 | 2/2010 | Rea | |
| 2010/0078244 A1 | 4/2010 | Pursifull | |
| 2010/0127002 A1 | 5/2010 | Bel | |
| 2012/0001743 A1 | 1/2012 | Cotten et al. | |
| 2012/0060800 A1 | 3/2012 | Green | |
| 2012/0067660 A1 | 3/2012 | Kashu et al. | |
| 2012/0325355 A1 | 12/2012 | Docheff | |
| 2013/0068905 A1 * | 3/2013 | Green | 248/220.21 |
| 2013/0069357 A1 | 3/2013 | Green | |
| 2013/0074816 A1 | 3/2013 | Green | |
| 2013/0092694 A1 * | 4/2013 | Green | 220/562 |
| 2013/0112768 A1 | 5/2013 | Hagenbuch | |
| 2013/0245864 A1 | 9/2013 | Frazier et al. | |
| 2014/0053800 A1 | 2/2014 | Steffen et al. | |

FOREIGN PATENT DOCUMENTS

| | | |
|---|---|---|
| WO | WO 2012/036768 A1 | 3/2012 |
| WO | WO2012036768 | 3/2012 |
| WO | WO2013039708 | 3/2013 |
| WO | WO2013048812 | 4/2013 |
| WO | WO2013058988 | 4/2013 |

OTHER PUBLICATIONS

Caterpillar 785C Mining Truck Spec Sheet, 2010.

* cited by examiner

MODULE CONTAINMENT OF FUEL CONTROL SYSTEM FOR A VEHICLE

BACKGROUND OF THE INVENTION

1. Field of the Invention

This invention is directed to a unitary assembly for mounting a fuel control system on a vehicle such as, but not limited to an off-road high capacity vehicle. A module includes a unitary structure at least partially defined by a mounting assembly structured to support and contain at least a portion of the fuel control system in operative communication with the powering engine of the vehicle. As such, the module and the mounting assembly are cooperatively structured to collectively retain an electronic control unit, a containment structure or fuel tank and other operative components of the fuel control system as a self-contained unit on the vehicle.

2. Description of the Related Art

Mine haul trucks are off-highway, two axle, rigid dump trucks, specifically engineered for use in high production mining and heavy duty construction environments. As such, haul truck capacities typically range from 50 short tons (45 tons) to 400 short tons (363 tons). In addition, trucks having the largest and highest payload capacity are referred to as "ultra class" trucks. This ultra class includes haul trucks having a payload capacity of at least 300 short tons or greater. Numerous manufacturers throughout the world produce such mammoth vehicles which are engineered for both performance and long operable life. Trucks of this type are developed specifically for high production duty wherein material is transported in large quantities in order to lower transportation costs on a cost-per-ton basis.

Typically mine haul trucks are powered by either direct drive diesel or diesel electric power trains frequently including a multiple horse power turbo charged diesel engine. Due to the exceptional size and weight of such vehicles, they cannot be driven on public access roads, but are ideal for high production environments wherein massive quantities of material must be moved, handled, relocated, etc. on a continuous or regular basis.

Accordingly, it is well recognized that distillate fuels, specifically diesel, are used as the primary fuel source for such vehicles. Attempts to maximize the operational efficiency, while maintaining reasonable safety standards, have previously involved modified throttle control facilities. These attempts serve to diminish adverse effects of control mechanisms which may be potentially harmful to the vehicle engine operation as well as being uneconomical. Typical adverse effects include increased fuel consumption and wear on operative components. Therefore, many diesel engines and the vehicles powered thereby are expected to accommodate various types of high capacity payloads and provide maximum power for relatively significant periods of operation. As a result, many diesel engines associated with heavy duty and off-road vehicles are commonly operated at maximum or near maximum capacity resulting in an attempted maximum power delivery from the vehicle engine and consequent high rates of diesel consumption. It is generally recognized that the provision of a substantially rich fuel mixture in the cylinders of a diesel engine is necessary for providing maximum power when required. Such continued high capacity operation of the vehicle engine results not only in wear on the engine components but also in high fuel consumption rates, lower operating efficiencies, more frequent oil changes and higher costs of operation.

Accordingly, there is a long recognized need for a fuel control system specifically intended for use with high capacity, off-road vehicles including mine haul vehicles of the type generally described above that would allow the use of more efficient fueling methods using other commonly available fuel sources. Therefore, an improved fuel control system is proposed which is determinative of an effective and efficient operative fuel mixture comprised of a combination of gaseous and distillate fuels. More specifically, gaseous fuel can comprise natural gas or other appropriate gaseous type fuels, wherein distillate fuel would typically include diesel fuel.

Such a preferred and proposed fuel control system should be capable of regulating the composition of the operative fuel mixture on which the vehicle engine currently operates to include 100% distillate fuel, when the vehicle's operating mode(s) clearly indicate that the combination of gaseous and distillate fuels is not advantageous. Further, such a proposed fuel control system could have an included secondary function to act as a general safety system serving to monitor critical engine fuel system and chassis parameters. As a result, control facilities associated with such a preferred fuel control system should allow for discrete, user defined control and safety set points for various engine, fuel system and chassis parameters with pre-alarm, alarm and fault modes.

SUMMARY OF THE INVENTION

This invention is directed to a fuel control system specifically comprising technology that allows for the safe and efficient use of a gaseous fuel such as, but not limited to, natural gas or liquid gas (LNG) in combination with a predetermined quantity of conventional distillate fuel, such as diesel fuel. As a result, the composition of an "operative fuel mixture" used to power a vehicle engine will, dependent on the operating modes of the vehicle engine and operating characteristics of the engine during the operating modes, be either a predetermined combination of gaseous fuel and distillate fuel or substantially entirely distillate fuel, absent any contribution of gaseous fuel.

Moreover, the fuel control system of the present invention incorporates "real time" measurement capabilities specifically, but not exclusively, of each of the gaseous fuel and distillate fuel and the operative fuel mixture. More specifically, metering technology appropriate to each of the gaseous and distillate fuels will be used to establish data display and data logs of the percentage of gaseous fuel and diesel fuel of the operative fuel mixture composition. Such appropriate metering will also facilitate the tracking of the overall gaseous fuel and diesel fuel consumption. Also, the preferred measurement capabilities operative with the respective metering for each of the gaseous and distillate fuels will facilitate the optimization of both of the gaseous fuel throttle position and diesel fuel throttle position in a closed loop fashion.

The fuel control system of the present invention is preferably designed to function as a master controller and a safety system, specifically adaptable for high capacity, off-road "mine haul" type vehicles. It is to be noted that the term "operative fuel mixture" may, as set forth above, include a composition composed of both gaseous fuel and distillate fuel. However, for purposes of clarity, the term "operative fuel mixture" may also specifically refer to a composition comprised substantially entirely of the distillate fuel. Accordingly and as set forth in greater detail hereinafter, the composition of the operative fuel mixture may best comprise both gaseous fuel and distillate fuel in predetermined quantities. However, when the vehicle engine is operating at different predetermined operating modes, maximum efficiency and/or safe operation of the vehicle may best be accomplished when the operative fuel mixture is substantially entirely composed of distillate fuel.

Also, the term gaseous fuel is meant to include natural gas, liquid nitrogen gas (LNG) or other gaseous type fuels appropriate for engine operation. Similarly, the term distillate fuels refers primarily to a diesel fuel in that the high capacity, off-road mine haul trucks and similar vehicles operate utilizing an electronic diesel engine comprising "fly-by-wire" type throttle control signals. As commonly recognized, the "fly-by-wire" systems incorporate an electronic interface wherein throttle positions and other operative features associated with the vehicle are converted to electronic signals transmitted to appropriate controls, processors, etc. which are determinative of vehicle engine operation.

Accordingly, the fuel control system of the present invention incorporates an electronic control unit (ECU) which is structured to modulate the throttle position signal (TPS) conventionally transmitted from the vehicle throttle foot pedal, or other throttle assembly, to the vehicle engine control assembly. Therefore, upon receipt of the throttle position signal, the ECU generates and transmits a "modulated throttle position signal" to the vehicle engine control assembly dependent at least in part on the operating mode(s) of the vehicle. The control system of the present invention further includes a gaseous control unit. The electronic control unit is further structured to generate an auxiliary fuel control signal which is transferred to the gaseous control unit dependent at least in part on the operating mode(s) of the vehicle.

The auxiliary control signal generated is transmitted concurrently to the modulated throttle position signal and both signals are determinative of a quantity of gaseous fuel and distillate fuel to be included in an operative fuel mixture on which the vehicle operates. Therefore, the modulated throttle position signal and the auxiliary control signal are collectively determinative of the composition of the operative fuel mixture on which the vehicle engine operates during at least a first predetermined number of the aforementioned operating modes of the vehicle engine.

As recognized in the operation of heavy duty, off-road mine haul vehicles, the operating modes of the vehicle include: low idle conditions when the vehicle is at rest; high idle conditions (dump mode) when the vehicle is at rest; the vehicle being unloaded on a zero grade support surface; loaded on a zero grade surface; unloaded in a climb orientation; loaded in a climb orientation; unloaded in a descent orientation and loaded in a descent orientation.

However, of the above noted operating modes of the mine haul vehicle, a "first predetermined number" of such operating modes are consistent with the composition of the operative fuel mixture including both the gaseous fuel and the distillate fuel in predetermined quantities. Such a first predetermined number of operating modes are herein recognized as including: unloaded condition of the vehicle in motion on a zero grade support surface; loaded condition of the vehicle in motion on a zero grade support surface; unloaded climb orientation of the vehicle I motion and loaded climb orientation of the vehicle in motion. Accordingly, maximum or increased efficiency of the vehicle engine when operating in the first predetermined number of operating modes can best be accomplished using an operative fuel mixture comprised of both gaseous fuel and distillate fuel.

However, a second predetermined number of operating modes of the vehicle engine include: a low idle, vehicle at rest; high idle (dump mode) vehicle at rest; unloaded descent orientation of the vehicle in motion and loaded descent orientation of the vehicle in motion. Accordingly, during operation of the vehicle in the second predetermined number of operating modes, the composition of the operative fuel mixture preferably comprises only the distillate fuel and is substantially void of any added gaseous fuel.

The fuel control system of the present invention and more specifically the electronic control unit further comprises programming capabilities which are operative to perform a throttle mapping function comprising the ability to determine pre-selected discrete throttle maps for at least some of said first predetermined number of operating modes. Moreover, each of the discrete throttle maps may be defined by the operative fuel mixture comprising a combined predetermined gaseous fuel and distillate fuel for vehicle engine operation, whereby the maximum possible amount of gaseous fuel is utilized for the particular engine payload scenario, in keeping with the normal combustion parameters, such as exhaust gas temperature (EGT), cylinder pressure and detonation limits. In addition, the throttle mapping capabilities include the ability to alter the programmed throttle maps based on both ambient temperature and manifold air temperature (MAT). It is recognized the gaseous fuel component of the operative fuel mixture can be present in higher percentages based on a lower temperature of the combustion air. By way of example only, the same mine haul truck operating in winter, or in an overall cooler operating environment, can have a greater amount of gaseous fuel contained in the operative fuel mixture than when operating during summer. Accordingly, the ambient temperature and the manifold air temperature at least partially control the quality of the operative fuel mixture at least to the extent of determining the amount of gaseous fuel capable of being included in the composition of the operative fuel mixture. The added safety advantages include the regulation or restriction of gaseous fuel to the operative fuel mixture when the mine haul truck is operating in varying environmental conditions as determined by pre-established temperature parameters.

In addition, the electronic control unit further comprises recognition capabilities operative with the programming capabilities and structured to recognize "operating characteristics" of the vehicle during at least some of the above noted operating modes. As used herein, the predetermined operating characteristics of the mine haul vehicle comprise: engine RPM; vehicle wheel speed; distillate throttle position signal; gaseous auxiliary control signal; engine coolant temperature sensing vehicle pitch and payload condition. Therefore, the recognition capability of the electronic control unit serves to recognize certain operating modes of the vehicle and concurrently recognize the operating characteristics of the vehicle while in the determined operating mode.

It is also to be noted that operation of the vehicle's engine using a gaseous fuel and distillate fuel operative mixture is also dependent on the engine having reached a minimum operating temperature. As such, the fuel control system includes engine coolant temperature sensing capabilities which are operative to prevent or restrict the inclusion of gaseous fuel in the operative fuel mixture until the engine has reached a predetermined minimum operating temperature. As indicated the operating temperature of the engine may be established by sensing the temperature of the engine coolant. Further, this feature prevents improper operation of either a liquid natural gas (LNG) vaporizer or a compressed natural gas (CNG) high pressure regulation system, both of which rely on the circulation of sufficiently hot engine coolant for their operation.

Additional features of the fuel control system of the present invention include monitoring capabilities structured to monitor a plurality of predetermined vehicle safety set points, each of which are determinative of safe operation of the vehicle. As a result, the monitoring capabilities include a control function interactive with the gaseous control unit to restrict gaseous fuel and thereby restrict the inclusion of the gaseous fuel in the operative fuel mixture when the monitoring capabilities indicate that the predetermined vehicle safety set points have been reached or exceeded. Elimination of the gaseous fuel from the operative fuel mixture will thereby restrict or regulate operation of the vehicle so as to bring it within the acceptable parameters of the predetermined vehicle safety set points. As a result, the control function associated with the monitoring capabilities is cooperatively structured with the gaseous control unit to substantially eliminate gaseous fuel content from the operative fuel mixture. In doing so, the control function is operative to effectively negate both modulation of the throttle position signal and generation of the auxiliary fuel control signal, dependent on recognition of at least predetermined or preset ones of the operating modes of the vehicle.

To further facilitate and assure safe operation of the vehicle, the electronic control unit further comprises programming capabilities which allows the pre-selection of the aforementioned plurality of predetermined vehicle safety set points. The user programmable safety set points may comprise: engine EGT; engine vibration; engine manifold air temperature (MAT); engine manifold air pressure; engine vacuum; lower explosive limits (LEL) in the engine bay; high gaseous fuel supply pressure (high pressure stage); high gaseous fuel supply pressure (low pressure stage); engine RPM; wheel speed and control; vehicle pitch limits and vehicle roll limits; flame detection capabilities for the chassis and engine bay as well as gas detection of the driver cab and engine bay. Moreover, the safety set points as at least partially outlined above can be "non-latching" or "latching" (i.e. locked out) depending on whether the monitored values exceed discrete "pre-alarm" or "alarm" set points respectively. Once a pre-alarm set point has been exceeded, the operative fuel mixture comprises 100% distillate fuel, which is maintained until the electronic control unit detects that the vehicle has come to an idle condition for a specified period of time, at which time the pre-alarm condition is reset automatically. In the case of an alarm set point being exceeded, the operative fuel mixture comprises 100% distillate fuel, which is maintained until the electronic control unit is reset by authorized personnel. Additional administrative features include the electronic control unit storing the pre-alarm and alarm information in non-volatile memory for subsequent retrieval and reporting. Additional data logging is accomplished for additional predetermined parameters to facilitate operator performed diagnostics.

Additional safety features are incorporated in the fuel control system of the present invention by providing an emergency stop or gas shut-off facility which may be manually activated by the operator or other personnel. This emergency stop or shut-off terminates gaseous fuel operation remotely, such as from the vehicle cab, as well as from a location exteriorly of the vehicle. Finally, an additional, user programmable set point is provided which allows for operation on 100% distillate fuel in the event the gaseous fuel supply level drops below a predetermined value.

In addition, yet another preferred embodiment of the present invention comprises a "user defined" gaseous fuel inhibiting feature. More specifically, the operator is provided and/or has access to a generic contact or control facility that is operative to restrict or prevent the use or inclusion of gaseous fuel in the operative fuel mixture based on any one or more factors that may be predetermined or otherwise "user defined". In at least partial accord therewith a "status display facility", preferably in the form of a bi-LED annunciating device, may be made available to the operator. Such an annunciating device or facility will allow the operator to immediately recognize the operational status as well as the overall status of the fuel distribution system of the present invention including, but not limited to, the status of the alarm, pre-alarm hold, control hold, composition of the operative fuel mixture (existence of gaseous fuel in the composition), etc. Therefore, the electronic control unit incorporated in the fuel control system of the present invention includes structural and operative features which facilitate the determination of the preferred or required composition of the operative fuel mixture being both distillate and gaseous fuel combined or substantially 100% distillate fuel, considering the current operating modes and operating characteristics of the vehicle.

In regard to the operating modes and operating characteristics of the vehicle engine, it is recognized that gaseous fuel is not included in the operative fuel composition when the vehicle is in a low idle, high idle or descent modes of operation. Accordingly the electronic control unit discriminates between the operating modes by referencing operating characteristics such as engine speed, wheel speed, engine map and vehicle pitch. Further, each control value of the aforementioned set points is user programmable and non-latching, i.e., exceeding control set point values results in a temporary modification of vehicle engine operation. Moreover, versatility of the fuel control system of the present invention and the operation of the mine haul vehicle may be significantly enhanced by including remote monitoring capabilities. As such, the various operating modes and or operating characteristics can have their respective parameters remotely varied or adjusted, such as by means of cellular, satellite or other appropriate communication networks.

Another operative feature of the fuel control system of the present invention is the ability to interface with the OEM chassis and engine data network of the mine haul truck. It is recognized that all modern electronic diesel engines incorporate a "controller area network" or Can-bus that allows the OEM controller of the vehicle to interface with all of the various sensors and end-devices used on the engine. Accordingly, by interfacing with the Can-bus network, the system of the present invention can utilize existing sensor data such as, but not limited to, that associated with the wheel speed, MAP, MAT, engine RPM, etc. as well as chassis data, without having to utilize or rely on dedicated sensors.

Another preferred embodiment of the present invention is directed to a unitary assembly structured to retain at least a portion of the operative and interactive components of a fuel control system of the type used on a vehicle, as described herein in greater detail. More specifically, the fuel control system of the present invention and in particular, the unitary assembly used for its support, containment, and operative positioning is adapted for the effective and efficient powering of the engine of a variety of different commercial vehicles but in particular, mine haul trucks.

As such, the unitary assembly of the present invention comprises a module including and/or at least partially structured in the form of a mounting assembly disposed on the vehicle. The module and the cooperatively structured mounting assembly are structured for containment and support of a fuel supply such as, but not limited to an alternate or auxiliary fuel supply. More specifically, a containment structure is disposed on the mounting assembly within the unitary module and includes at least one, but depending on the specific vehicle and/or other commercial application, a plurality of fuel tanks. Each of the one or more fuel tanks is structured to retain an alternate or primary fuel supply in an operative, communicating disposition which facilitates the interaction thereof with the other operative components of the fuel control system for the powering of the vehicle engine.

As also set forth above, the fuel control system contained within the module and mounting assembly includes an electronic control unit. As set forth above, the electronic control unit is operative, as part of the fuel control system, to determine a quantity of the alternate fuel to be included in an "operative fuel mixture" in combination with a more conventional distillate fuel so as to power the vehicle engine. Moreover, the electronic control unit is further structured to facilitate distribution of the operative fuel mixture along with the metering of the alternate, fuel and the conventional distillate fuel, such as diesel. Therefore, the module and the mounting assembly are structured to collectively retain the electronic control unit, the containment structure comprising one or more fuel tanks and at least a portion of a remainder of the fuel control system as a self-contained, operative unit on the vehicle.

The various additional operative components of the fuel control system may include a gas train assembly disposed on the mounting assembly within the module. The fuel control system may also include a heat exchanger assembly; a vaporizer assembly; and a connection assembly. The connection assembly in turn comprises appropriately structured wiring, conduits, mountings, connectors, etc. which are effective to establish electrical interconnection and/or fluid communication with and between the operative components of the fuel control system and/or between the vehicle and the fuel control system effectively services.

These and other objects, features and advantages of the present invention will become clearer when the drawings as well as the detailed description are taken into consideration.

BRIEF DESCRIPTION OF THE DRAWINGS

For a fuller understanding of the nature of the present invention, reference should be had to the following detailed description taken in connection with the accompanying drawings in which.

Like reference numerals refer to like parts throughout the several views of the drawings.

DETAILED DESCRIPTION OF THE PREFERRED EMBODIMENT

As represented in the accompanying Figures, the present invention is directed to a unitary assembly for supporting, retaining and operatively disposing a plurality of operative components of a fuel control system 105 of the type used to regulate fuel distribution to a powering engine of a vehicle. More specifically, the vehicle with which the fuel control system is adapted for use preferably comprises an off-road, high capacity industrial vehicle such as, but not limited to, a mine haul vehicle, bulldozer, etc.

Figure 1:
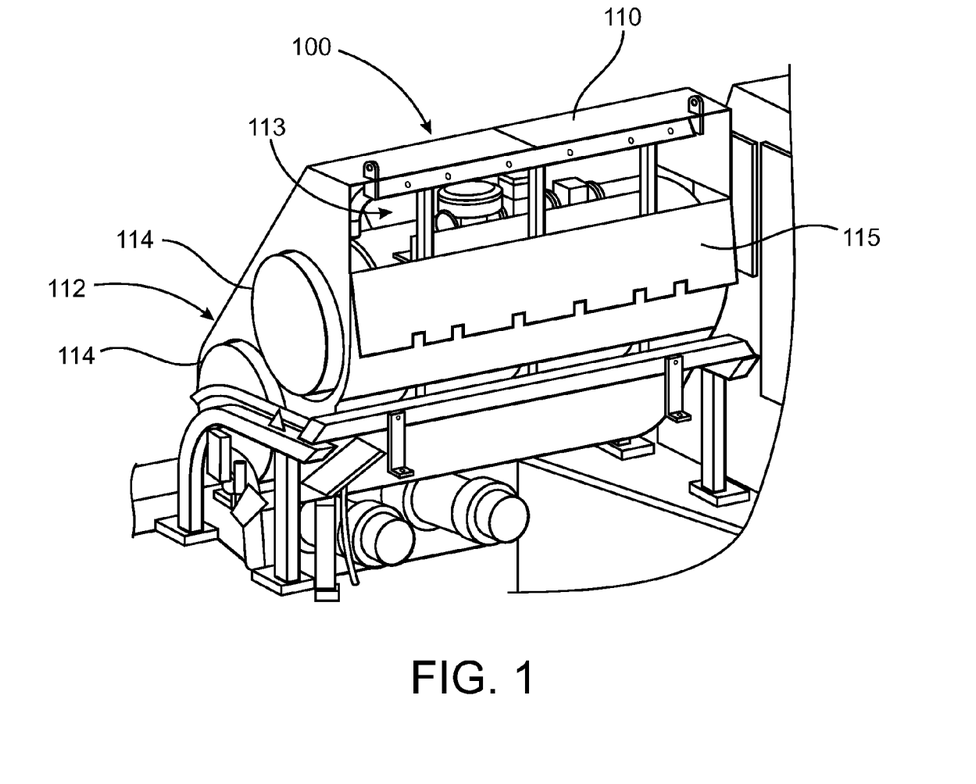
FIG. 1 is a rear perspective view of the module and cooperatively structured mounting assembly in an at least partially open configuration.
Figure 2:
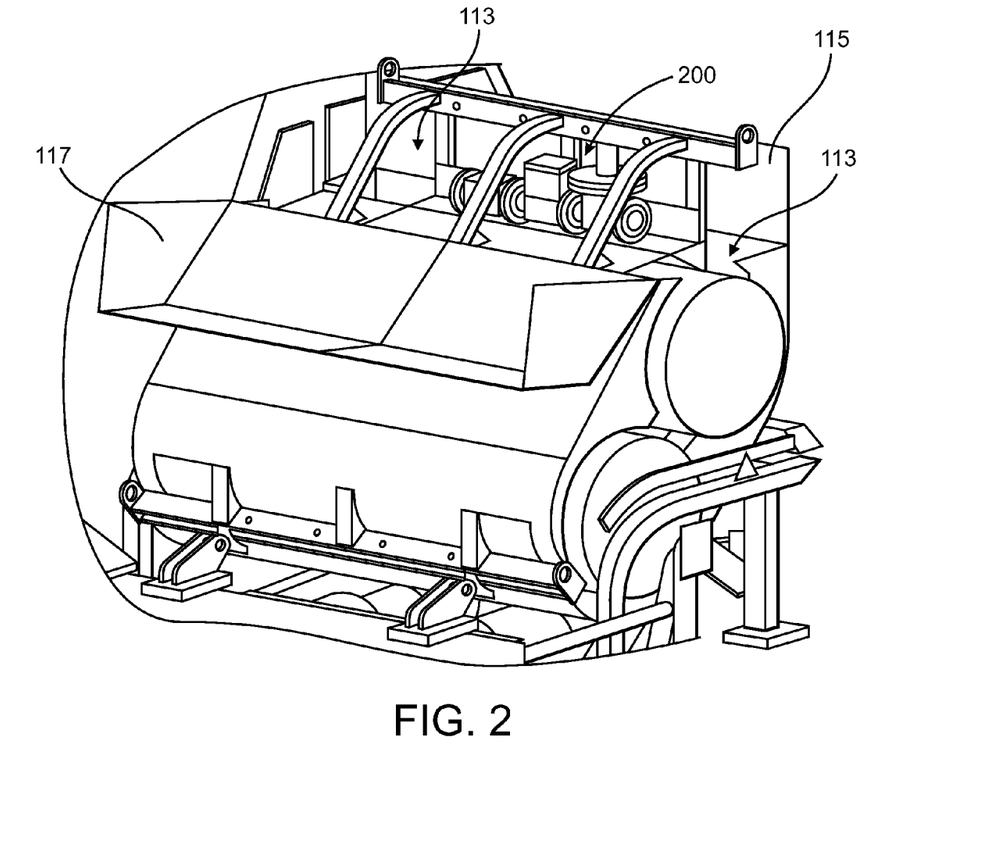
FIG. 2 is a front perspective view of the embodiment of FIG. 1.
Figure 6:
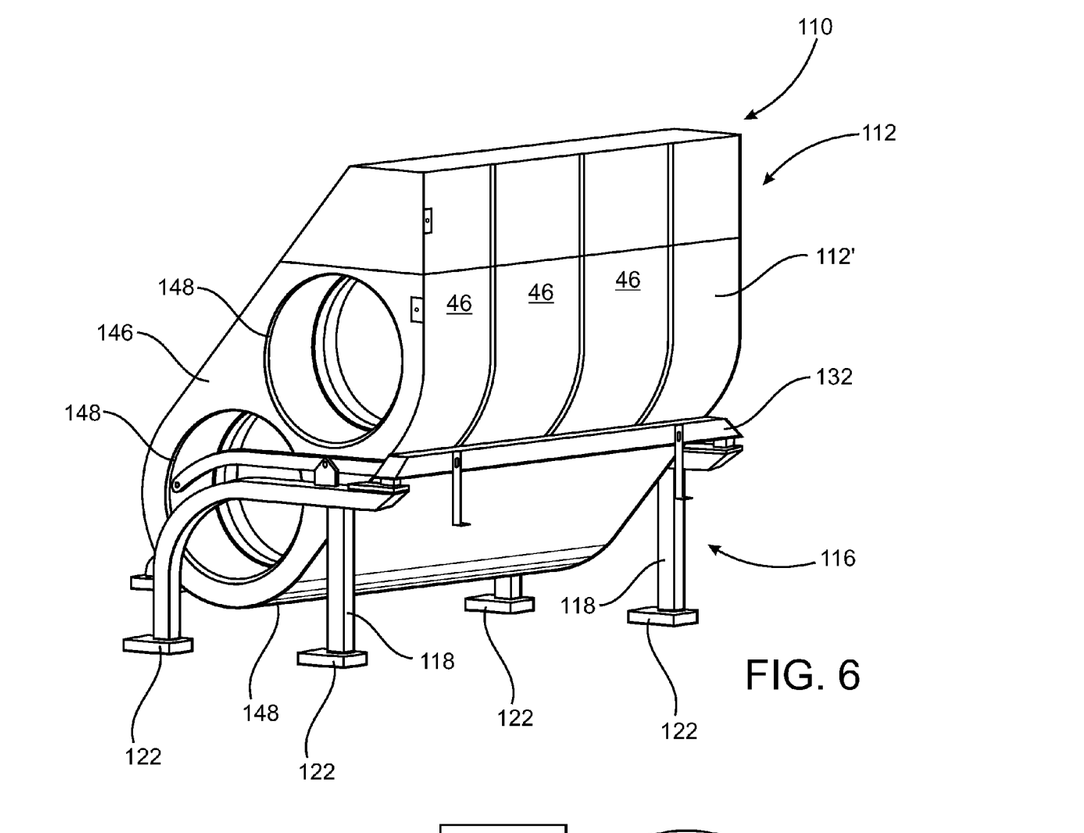
FIG. 6 is a perspective view of the embodiment of FIGS. 4 and 5 in another operative orientation.
Figure 7:
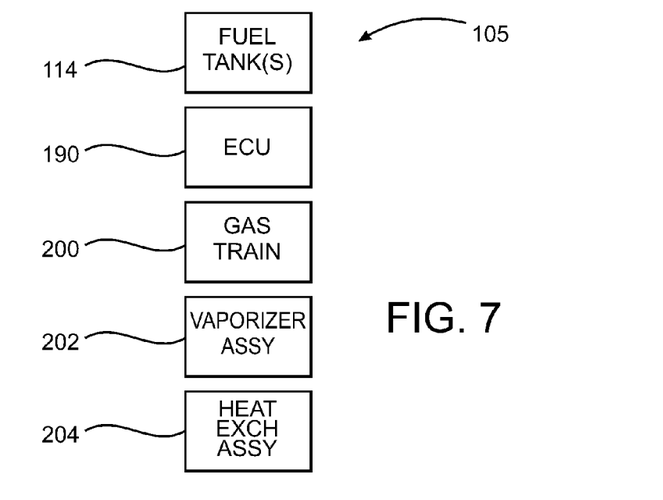
FIG. 7 is a schematic representation in block diagram form including various operative and interactive components of the fuel control system contained and supported in the module and cooperatively structured mounting assembly of the embodiments of the FIGS. 1, 2, and 4-6.

Accordingly, the unitary assembly of the present invention as initially represented in FIGS. 1 and 2 and comprises a module 100 which is cooperatively structured in the form of a mounting assembly 110. The mounting assembly 110 of the module 100 includes a housing 112 including an appropriate dimension, configuration and overall structure to retain, support, and operatively position a containment structure. The containment structure includes at least one, but in some practical applications, a plurality of fuel tanks 114. Structural and operative details of the module 100 and the mounting assembly 110 will be described in greater detail with specific reference to FIGS. 4-6. However, with further reference to FIGS. 1 and 2, the module 100, including the cooperatively structured mounting assembly 110, include at least an interior portion 113 capable of being opened and closed through manipulation of panels, hoods and/or door members 115 and 117. The interior portion 113 is dimensioned and configured to contain at least some of the operative components of the fuel control system 105 including, but not limited to an electronic control unit 190, a gas train 200, a vaporizer 202 and at least a heat exchanger 204, as schematically represented in FIG. 7. For purposes of clarity, the specific structural details of the various components of the fuel control system 105 are represented in schematic form.

As set forth above, the electronic control unit 190 is structured to determine a quantity of alternate or auxiliary fuel such as, but not limited to, liquid natural gas (LNG) to be included within an operative fuel mixture on which the vehicle engine operates. As also set forth above, the operative fuel mixture contains a predetermined and/or appropriate amount of conventional distillate fuel such as diesel. Therefore, the electronic control 190 unit is further structured to facilitate distribution of the operative fuel mixture into the vehicle engine. Moreover, this preferred embodiment of the present invention as represented in FIGS. 1-3 and 7 is directed to the module 100 structurally formatted to include the mounting assembly 110 so as to collectively retain support and operatively position the electronic control unit 190, the containment structure 114 and at least a portion of a remainder of the various interactive and operative components of the fuel control system 105 into a self contained unit for effective and efficient placement on an off-road, high capacity vehicle. Due to the unitary assembly defined by the module 100 and the cooperatively structured mounting assembly 110, an appropriate "containment area" can be established on and within the off-road, high capacity vehicle. The module 100, especially when disposed within the appropriate containment area will accomplish and facilitate the effective operation and enhancement of the overall versatility of the fuel control system by making it readily adaptable for use in combination with and mounting on a variety of different high capacity, off road vehicles such as a plurality of different mine haul trucks.

Figure 3:
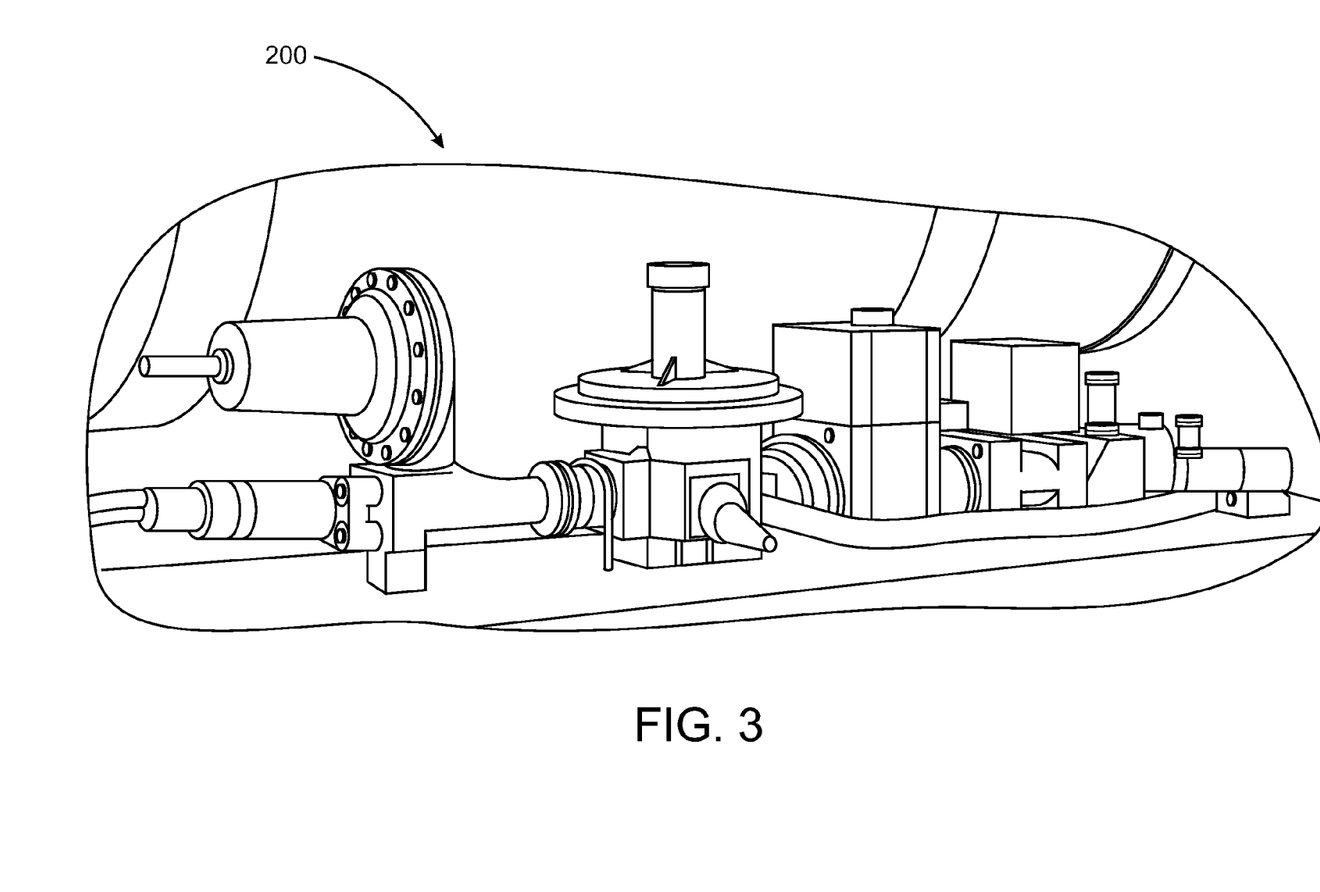
FIG. 3 is a perspective view of a gas train assembly associated with the fuel control system mounted within the module and mounting assembly of the embodiments of FIGS. 1 and 2.

With primary reference to FIG. 3 and as also at least partially represented in FIGS. 1 and 2, a portion of the fuel control system 105 comprises the aforementioned gas train

200. As such, the gas train 200 includes interactive components which facilitate the above noted and described operation and function of the fuel control system. More specifically, the gas control unit 200 includes a high pressure gas control valve 210; a high pressure gas regulator 212; a low pressure gas control valve 214; a low pressure gas regulator 216; a gas throttle body 218 and one or more air mixers 220.

More specific structural details of the module 100, including the mounting assembly 110 of the embodiment of FIGS. 1, 2 and 4-6 include the housing 112 being structured to include the alternate fuel supply (LNG) disposed within a containment structure. The containment structure comprises at least one but in certain practical applications, a plurality of fuel tanks 114. As also represented, the housing 112 is supported and interconnected to the vehicle by means of a base assembly, generally indicated as 116. The base 116 includes a plurality of support legs 118, each of which include leg segments 120 and 120' having the lower ends thereof fixedly secured, such as by welding the accompanying mounting pads 122 to an appropriate portion of a module containment area of the vehicle on which the mounting assembly 110 is disposed.

Figure 4:
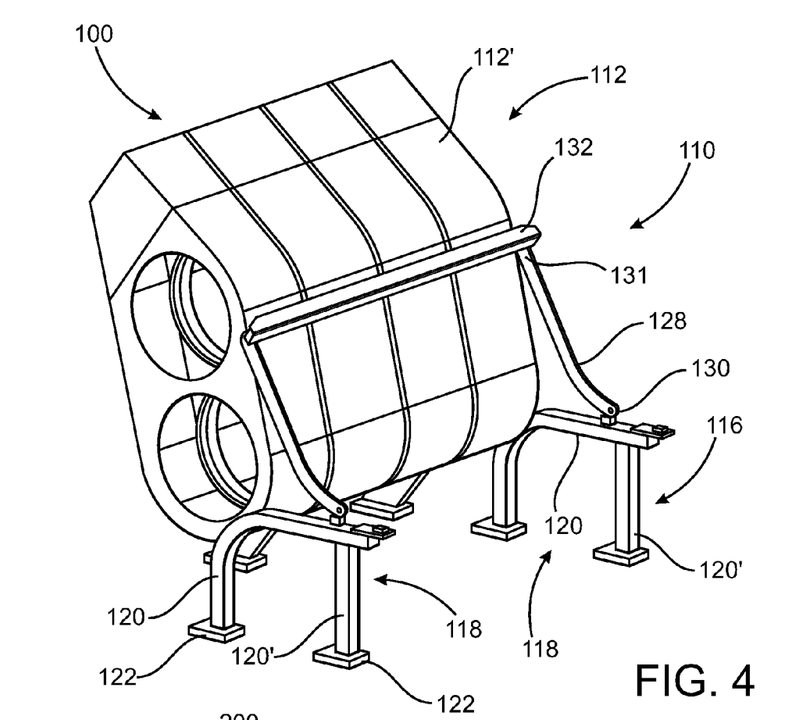
FIG. 4 is a perspective view of the module and mounting assembly of the embodiments of FIGS. 1 and 2 in one of a possible plurality of operative orientations.
Figure 5:
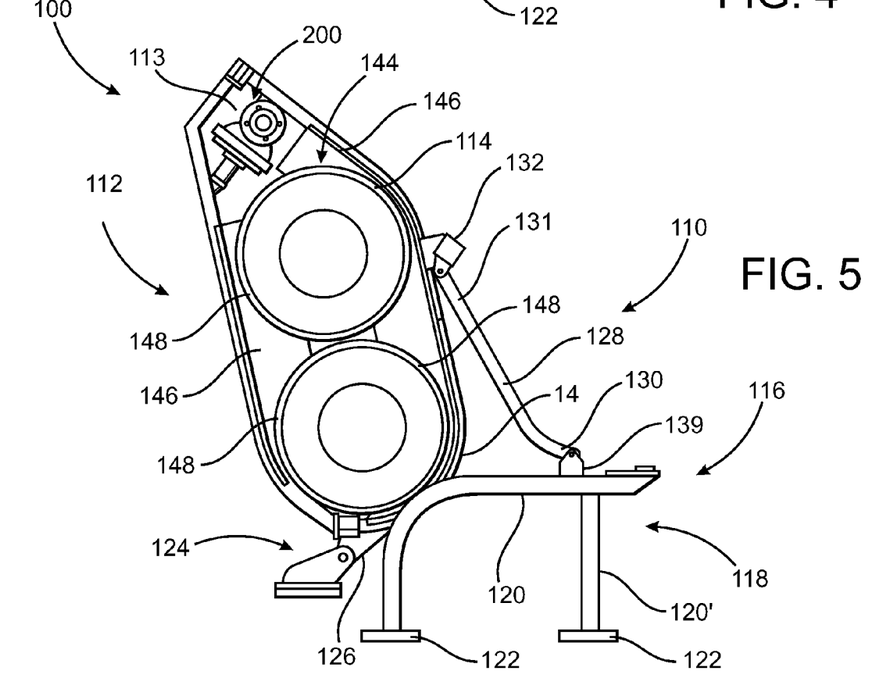
FIG. 5 is a side view of the embodiment of FIG. 4 including interior portions with at least a portion of the fuel control system contained therein.

The base 116 may also include a connecting assembly comprising at least one but in certain practical applications a plurality of at least two hinge structures generally indicated as 124. Each of the hinge structures 124 is connected to an appropriate link 126 or like structure secured to an under portion of the housing 114 as clearly represented. The structural and operative features of each of the one or more hinge structures 124 is such as to facilitate the selective positioning or movement of the housing 112 as well as the containment structure or fuel tanks 114 between a first orientation, as represented in FIG. 6, and a second substantially upright orientation, as represented in FIGS. 4 and 5. Accordingly, the connecting hinge structures 124 serve to movably interconnect the housing 112 to the module containment area of the vehicle and further serve to support the housing 112 at least when the housing is in the second orientation of FIGS. 4 and 5. The disposition of the hinge structures 124 also add to the support of the housing 112 when it is in the first orientation, as clearly represented in FIG. 6. The one or more hinge structures 124 may be considered a part of the base 116 due to their support of the housing 112 when at least in the second orientation and most probably when in both the first and second orientations. However, dependent upon the structure, configuration and dimension of the mine haul vehicle and the module containment area in which the mounting assembly 110 is disposed, the one or more hinge structures 124 may be considered independent of the base 116 by virtue of their location being not directly adjacent to or operatively associated with the base 116.

Further with regard to the selective positioning of the housing 112 in either the first or second orientations, the mounting assembly 110 further includes a retaining assembly comprising at least one, but preferably a plurality of at least two retaining arms or bars 128. The one or more retaining arms 128 serve to maintain and at least partially support the housing 112, at least when it is in the second orientation as clearly demonstrated in FIGS. 4 and 5 when in their operative position. Each of the retaining arms 128 include opposite ends removably connected, as at 130, to the correspondingly disposed support arm 118. The opposite end of each of the retaining arms 128 is removably connected, as at 131, to the housing 112 and more specifically to a brace or cross brace structure 132.

Moreover, each of the retaining arms 128 is removed from the stored orientation and disposed in the supporting orientation of FIGS. 4 and 5. When in such a supporting orientation, the opposite end 130 is removably connected to the upstanding connecting flange 139, by a threaded knob or like connector. The removable but stable interconnection of the opposite ends 130 and 131, as at 130' and 131', to the mounting flange 139 and the base 132, respectively, will serve to assure that the retaining arms 128 are maintained in their operative, supporting, retaining position between the base 116 and the housing 112 and/or brace 132. However, the removable interconnection of each of the retaining arms 128 in their supporting, retaining position facilitates the easy disconnection of the retaining arms 128 for selective disposition in their stored orientation in order to dispose the housing 112 in the first orientation.

The stability of the containment structure, comprising the one or more fuel tanks 114 within the interior of the housing 112, is further enhanced by a stabilizing assembly 144 also at least partially disposed on the interior of the housing 112. The stabilizing assembly 144 includes at least one but preferably a plurality of stabilizing members 146 disposed in spaced relation to one another and collectively extending along the length of the one or more fuel tanks 114 defining the containment structure for the fuel supply. In addition, the stabilizing members 46 may be disposed on opposite sides of fuel tanks 114. In addition, each or at least some of the stabilizing members 146 include a recessed segment or portion 148 at least partially dimensioned and configured to the corresponding exterior configuration of each of the fuel tanks 114. As such, the plurality of stabilizing members 146 can be defined as collectively and at least partially surrounding and/or "sandwiching" the plurality of fuel tanks 114 there between. By virtue of this cooperative disposition and structure, movement or inadvertent, unintended displacement of the one or more fuel tanks 114 within the interior of the housing 112 is eliminated or significantly restricted. In addition, the stabilizing assembly 146 can be defined by a plurality of the stabilizing members 148 which may vary in number, size, configuration, etc. so as to accommodate a confronting engagement or relation with the one or more fuel tanks 114 in a manner which facilitates the ability to restrict the displacement or movement of the fuel tanks 114 within the interior of the housing 112, whether the housing 112 is in either the aforementioned first or second orientations.

Since many modifications, variations and changes in detail can be made to the described preferred embodiment of the invention, it is intended that all matters in the foregoing description and shown in the accompanying drawings be interpreted as illustrative and not in a limiting sense. Thus, the scope of the invention should be determined by the appended claims and their legal equivalents.

Now that the invention has been described,

What is claimed is:

1. An assembly for the unitary containment of a fuel control system on a vehicle, said assembly comprising:
   a module including a mounting assembly disposed and structured for containment and support of at least a portion of the fuel control system on the vehicle,
   a containment structure disposed on the mounting assembly and including at least one fuel tank disposed and structured to retain a fuel supply associated with the fuel control system,
   the fuel control system including an electronic control unit disposed on said mounting assembly and structured to facilitate distribution of said fuel supply,
   said module disposed and structured to collectively retain at least said electronic control unit and said containment structure and dispose said fuel supply in operative communication with a powering engine of the vehicle,
a gas train assembly disposed on said mounting assembly within said module, and
said gas train assembly comprises a plurality of interactive components including: a high pressure gas control valve; a high pressure gas regulator; a low pressure gas regulator; and a gas throttle body.

2. An assembly as recited in claim 1 further comprising a vaporizer assembly disposed on said mounting assembly within said module.

3. An assembly as recited in claim 2 further comprising a heat exchanger assembly disposed on said mounting assembly within said module.

4. An assembly as recited in claim 3 further comprising a connection assembly disposed on said mounting assembly within said module.

5. An assembly as recited in claim 4 wherein said connecting assembly comprises a plurality of connecting structures operative to affect electrical interconnection or fluid communication with and between operative components of the fuel control system.

6. An assembly as recited in claim 1 further comprising a heat exchanger assembly disposed on said mounting assembly within said module.

7. An assembly as recited in claim 1 further comprising a connection assembly disposed on said mounting assembly within said module.

8. An assembly as recited in claim 7 further comprising wherein said connection assembly comprises a plurality of connecting structures operative to affect electrical interconnection or fluid communication with and between operative components of the fuel control system.

9. An assembly as recited in claim 1 wherein said containment structure comprises a plurality of fuel tanks disposed and structured to retain the fuel supply of the fuel control system.

10. An assembly as recited in claim 1 wherein said mounting assembly comprises a plurality of components collectively included in said module, said plurality of components comprising said containment structure; a housing and a base mounted on the vehicle and disposed in supporting relation to remaining portions of said mounting assembly; a shield assembly included on said housing and disposed in protective relation to at least said containment structure.

11. An assembly as recited in claim 10 wherein said mounting assembly further comprises a stabilizing assembly disposed within said housing in confronting relation to said containment structure; said stabilizing assembly structured to restrict movement of said at least one fuel tank within said housing.

12. An assembly structured to retain a fuel control system for an off road, high capacity vehicle, said assembly comprising:
a unitary module including a mounting assembly disposed thereon and structured for containment and support of at least a portion of the fuel control system on the vehicle,
a containment structure disposed on said mounting assembly and including at least one fuel tank, said at least one fuel tank disposed and structured to retain an alternate fuel supply associated with the fuel control system,
an electronic control unit included within the fuel control system and structured to determine a quantity of said alternate fuel included within an operative fuel mixture on which the vehicle engine operates,
said electronic control unit further structured to facilitate distribution of said operative fuel supply to the vehicle engine,
said module and said mounting assembly structured to collectively retain said electronic control unit, said containment structure and at least a portion of a remainder of the fuel control system as a self-contained unit on the vehicle,
said remainder of the fuel control system included within said self-contained unit comprises a gas train assembly disposed on said mounting assembly within said module, and
said gas train assembly comprises a plurality of interactive components including a high pressure gas control valve; a high pressure gas regulator; a low pressure gas control valve; a low pressure gas regulator; and a gas throttle body.

13. An assembly as recited in claim 12 wherein said remainder of the fuel control system included within said self-contained unit comprises a heat exchanger assembly disposed on said mounting assembly within said module.

14. An assembly as recited in claim 12 wherein said remainder of the fuel control system included within said self-contained unit comprises a vaporizer assembly disposed on said mounting assembly within said module.

15. An assembly as recited in claim 12 wherein said remainder of the fuel control system included within said self-contained unit comprises a connection assembly including a plurality of connecting structures operatively disposed to affect electrical interconnection or fluid communication with and between operative components of the fuel control system.

16. An assembly as recited in claim 12 wherein said containment structure comprises a plurality of fuel tanks disposed and structured to retain said alternate fuel supply associated with the fuel control system.

17. An assembly as recited in claim 12 wherein said mounting assembly comprises a plurality of components collectively included in said module, said plurality of components comprising said containment structure; a housing and a base mounted on the vehicle and disposed in supporting relation to remaining portions of said mounting assembly; a shield assembly included on said housing and disposed in protective relation to at least said containment structure.

18. An assembly as recited in claim 17 wherein said mounting assembly further comprises a stabilizing assembly disposed within said housing in confronting relation to said containment structure; said stabilizing assembly structured to restrict movement of said at least one fuel tank within said housing.

19. An assembly for the unitary containment of a fuel control system on a vehicle, said assembly comprising:
a module including a mounting assembly disposed and structured for containment and support of at least a portion of the fuel control system on the vehicle,
a containment structure disposed on the mounting assembly and including at least one fuel tank disposed and structured to retain a fuel supply associated with the fuel control system,
the fuel control system including an electronic control unit disposed on said mounting assembly and structured to facilitate distribution of said fuel supply,
said module disposed and structured to collectively retain at least said electronic control unit and said containment structure and dispose said fuel supply in operative communication with a powering engine of the vehicle, and a vaporizer assembly disposed on said mounting assembly within said module.

20. An assembly for the unitary containment of a fuel control system on a vehicle, said assembly comprising:
- a module including a mounting assembly disposed and structured for containment and support of at least a portion of the fuel control system on the vehicle,
- a containment structure disposed on the mounting assembly and including at least one fuel tank disposed and structured to retain a fuel supply associated with the fuel control system,
- the fuel control system including an electronic control unit disposed on said mounting assembly and structured to facilitate distribution of said fuel supply,
- said module disposed and structured to collectively retain at least said electronic control unit and said containment structure and dispose said fuel supply in operative communication with a powering engine of the vehicle, and
- a heat exchanger assembly disposed on said mounting assembly within said module.

21. An assembly structured to retain a fuel control system for an off road, high capacity vehicle, said assembly comprising:
- a unitary module including a mounting assembly disposed thereon and structured for containment and support of at least a portion of the fuel control system on the vehicle,
- a containment structure disposed on said mounting assembly and including at least one fuel tank, said at least one fuel tank disposed and structured to retain an alternate fuel supply associated with the fuel control system,
- an electronic control unit included within the fuel control system and structured to determine a quantity of said alternate fuel included within an operative fuel mixture on which the vehicle engine operates,
- said electronic control unit further structured to facilitate distribution of said operative fuel supply to the vehicle engine,
- said module and said mounting assembly structured to collectively retain said electronic control unit, said containment structure and at least a portion of a remainder of the fuel control system as a self-contained unit on the vehicle, and
- said remainder of the fuel control system included within said self-contained unit comprises a heat exchanger assembly disposed on said mounting assembly within said module.

22. An assembly structured to retain a fuel control system for an off road, high capacity vehicle, said assembly comprising;
- a unitary module including a mounting assembly disposed thereon and structured for containment and support of at least a portion of the fuel control system on the vehicle,
- a containment structure disposed on said mounting assembly and including at least one fuel tank, said at least one fuel tank disposed and structured to retain an alternate fuel supply associated with the fuel control system,
- an electronic control unit included within the fuel control system and structured to determine a quantity of said alternate fuel included within an operative fuel mixture on which the vehicle engine operates,
- said electronic control unit further structured to facilitate distribution of said operative fuel supply to the vehicle engine,
- said module and said mounting assembly structured to collectively retain said electronic control unit, said containment structure and at least a portion of a remainder of the fuel control system as a self-contained unit on the vehicle, and
- said remainder of the fuel control system included within said self-contained unit comprises a vaporizer assembly disposed on said mounting assembly within said module.

* * * * *